United States Patent
Chou et al.

(10) Patent No.: US 11,893,711 B2
(45) Date of Patent: Feb. 6, 2024

(54) NEURAL NETWORK-BASED IMAGE PROCESSING WITH ARTIFACT COMPENSATION

(71) Applicant: Apple Inc., Cupertino, CA (US)

(72) Inventors: Jim C. Chou, San Jose, CA (US); Yun Gong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/841,387

(22) Filed: Jun. 15, 2022

(65) Prior Publication Data

US 2022/0309616 A1     Sep. 29, 2022

Related U.S. Application Data

(63) Continuation of application No. 17/000,260, filed on Aug. 21, 2020, now Pat. No. 11,367,167.

(51) Int. Cl.
*G06T 3/40*     (2006.01)
*G06T 7/11*     (2017.01)
*G06T 5/50*     (2006.01)
*G06T 5/00*     (2006.01)

(52) U.S. Cl.
CPC ............ *G06T 5/001* (2013.01); *G06T 3/4046* (2013.01); *G06T 3/4053* (2013.01); *G06T 5/50* (2013.01); *G06T 7/11* (2017.01); *G06T 2207/20084* (2013.01); *G06T 2207/20192* (2013.01); *G06T 2207/20221* (2013.01)

(58) Field of Classification Search
None
See application file for complete search history.

(56) References Cited

U.S. PATENT DOCUMENTS

| 8,098,950 | B2 | 1/2012 | Avinash |
| 10,904,476 | B1 | 1/2021 | Siagian et al. |
| 2012/0044372 | A1* | 2/2012 | Cote .................... H04N 23/667 348/222.1 |
| 2016/0307298 | A1* | 10/2016 | Chou ...................... G06T 5/001 |
| 2018/0349759 | A1 | 12/2018 | Isogawa et al. |
| 2019/0012768 | A1 | 1/2019 | Bilandi et al. |
| 2020/0265567 | A1* | 8/2020 | Hu ........................ G06T 5/007 |
| 2020/0394458 | A1 | 12/2020 | Yu et al. |
| 2020/0394459 | A1 | 12/2020 | Xu et al. |
| 2021/0006755 | A1 | 1/2021 | Kim et al. |
| 2021/0076066 | A1 | 3/2021 | Cho et al. |
| 2021/0076944 | A1 | 3/2021 | Anthony et al. |

* cited by examiner

Primary Examiner — James A Thompson
(74) Attorney, Agent, or Firm — Fletcher Yoder, P.C.

(57) ABSTRACT

Methods and systems include neural network-based image processing and blending circuitry to blend an output of the neural network to compensate for potential artifacts from the neural network-based image processing. The neural network (s) apply image processing to image data using one or more neural networks as processed data. Enhance circuitry enhances the image data in a scaling circuitry to generate enhanced data. Blending circuitry receives the processed image data and the enhanced data along with an image plane of the processed data. The blending circuitry also determines whether the image processing using the one or more neural networks has applied a change to the image data greater than a threshold amount. The blending circuitry then, based at least in part in response to the change being greater than the threshold amount and/or edge information of the image data, blends the processed data with the enhanced data.

19 Claims, 9 Drawing Sheets

NEURAL NETWORK-BASED IMAGE PROCESSING WITH ARTIFACT COMPENSATION

CROSS-REFERENCE TO RELATED APPLICATIONS

This application is a continuation of U.S. patent application Ser. No. 17/000,260, filed Aug. 21, 2020, entitled "NEURAL NETWORK-BASED IMAGE PROCESSING WITH ARTIFACT COMPENSATION," now U.S. Pat. No. 11,367,167, which is hereby incorporated by reference in its entirety for all purposes.

BACKGROUND

The present disclosure relates generally to neural network-based image processing and compensating for artifacts resulting from the network-based image processing in an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Neural networking may be used in electronic devices to in high-resolution image processing. While neural networks may provide very effective image processing in certain image areas, neural networks may fail in in certain corner cases. For instance, neural network-based image processing may fail around edges of images and/or near edges of areas to be processed (e.g., super-resolution areas). These failures of the neural network-based image processing may cause artifacts to occur when the image data is displayed.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As previously discussed, the neural networks may be used to perform some high-resolution image processing. However, neural network-based image processing may experience difficulties processing some image data. For example, the neural network-based image processing may create artifacts when processing an edge of an image. Additionally or alternatively, the neural network-based image processing may leave artifacts in regions transitioning between super-resolution areas of an image and/or may apply super-resolution to area to which super-resolution is to be avoided (e.g., faces). To improve image quality from neural network-based image processing, an image plane processed by the neural network may also be processed using memory scaling and rotate (MSR) circuitry. By providing the image plane to the MSR, the MSR may perform image processing to correct or alleviate artifacts introduced by the neural network-based image processing. For example, the MSR may apply smoothing at the edges of an image. Additional to or alternative to processing image color planes, the MSR may operate on alpha planes generated by the neural network. For example, the MSR may adjust blending of certain super-resolution areas of images. This blending may be used to avoid applying super-resolution to areas where super-resolution is undesirable (e.g., faces).

In some embodiments, more than one neural network may be used to perform image processing. For example, a first neural network may be used to detect a certain segmentation of the image while a second neural network may be used to generate a processed image that is blended with a non-neural network-based implementation which has better control over artifacts for corner case images.

Figure 1:
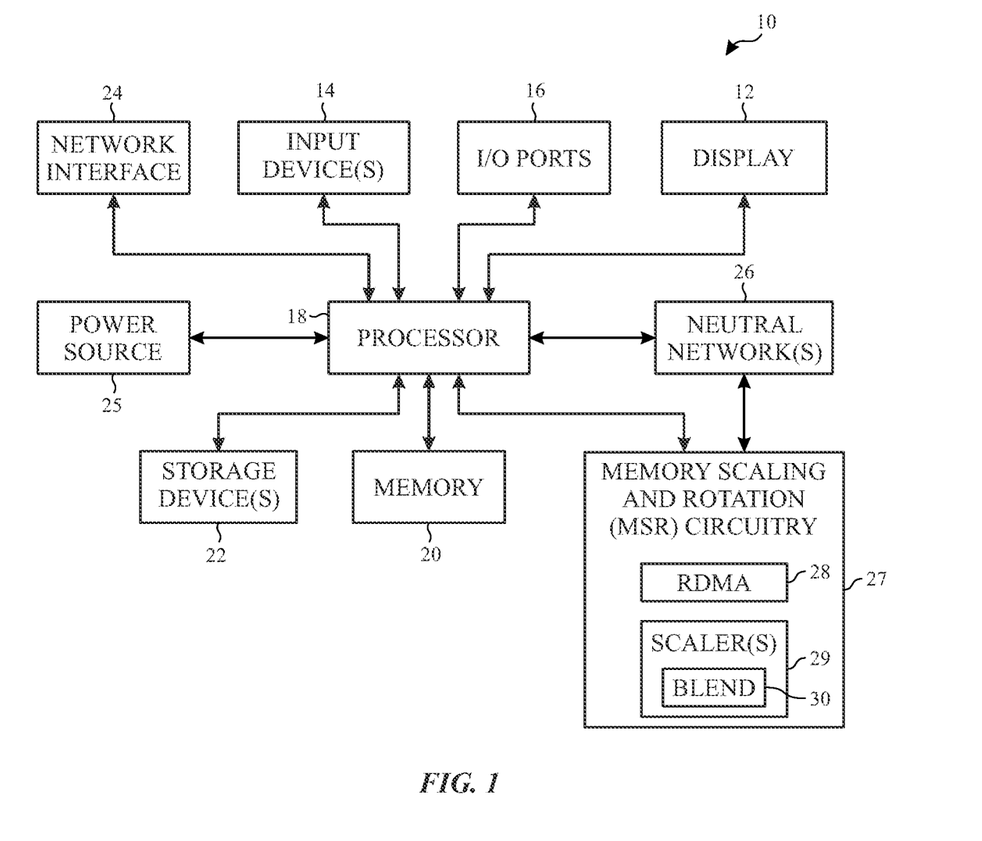
FIG. 1 is a block diagram of an electronic device with neural network-based image processing and a memory scaling and rotation (MSR) used to compensate for image artifacts due to the neural network-based image processing, in accordance with an embodiment of the present disclosure.

As will be described in more detail below, an electronic device 10, such as the electronic device 10 shown in FIG. 1, that uses neural network image processing and MSR-based artifact compensation may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes an electronic display 12, one or more input devices 14, one or more input/output (I/O) ports 16, a processor(s) 18 having one or more processor(s) or processor cores, local memory 20, a main memory storage device 22, a network interface 24, a power source 25, one or more neural networks 26, and/or memory scaling and rotation (MSR) circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor(s) 18 may execute instruction stored in local memory 20 and/or the main memory storage device 22 to perform operations, such as generating and/or transmitting image data. As such, the processor(s) 18 may include one or more processors, such as one or more microprocessors, one or more application specific processors (ASICs), one or more field programmable logic arrays (FPGAs), one or more graphics processing units (GPUs), or the like. Furthermore, as previously noted, the processor(s) 18 may include one or more separate processing logical cores that each process data according to executable instructions.

The local memory 20 and/or the main memory storage device 22 may store the executable instructions as well as data to be processed by the cores of the processor(s) 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10. The power source 25 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor(s) 18 to communicate data with the portable storage device. The I/O ports 16 may include one or more speakers that output audio from the electronic device 10. The processor(s) 18 may include one or more coprocessors or other microprocessors configured to supplement the capabilities of a primary processor (e.g., central processing unit).

The input devices 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using liquid crystal display (LCD), a self-emissive display, such as an organic light-emitting diode (OLED) display, or the like.

The neural network(s) 26 may be capable of performing a large number (e.g., billions or trillions) of operations per second. The neural network(s) 26 may be used to perform any tasks that may utilize machine learning, such as face recognition, image processing, animation, and the like. Furthermore, in at least some situations, the neural network(s) 26 may be capable of performing tasks in a more energy efficient manner than the processor(s) 18. The neural network(s) 26 may include dedicated neural network hardware, such as Apple's Neural Engine (ANE), general purpose hardware, and/or software. For instance, the neural network may be implemented on the ANE, on a GPU, on a CPU, or other suitable location.

As previously discussed, the neural networks(s) 26 may be used to perform high-resolution image processing, but the neural network(s) 26 may introduce artifacts into the image data. To address this issue, the neural network(s) 26 may generate a segmentation map and use the segmentation map as a guide for enhancement using peaking and enhancement values. For example, when scaling and enhancing an image, it may be more desirable to enhance a region of interest more than the background. The neural network(s) 26 may be used to perform this differential enhancement and detection. As another example, human perception is typically more sensitive to enhancement to human faces than other content types. Therefore, the neural network(s) 26 may be able to segment out faces to be enhanced less than other content.

Additionally or alternatively, the neural network(s) 26 may be used to perform scaling and enhancement of an image, and the resulting image may be blended with other scaling and enhancement algorithms (e.g., in the MSR circuitry 27) where portions of the image that are generated by neural network(s) 26 may contain artifacts and may be blended less than the output from the MSR circuitry 27. In other words, the MSR circuitry 27 may be used to at least partially ameliorate the artifacts introduced by the neural network(s) 26 before the image data is displayed on the electronic display 12. Using segmentation, part of the image may be processed using the neural network(s) 26 alone while another portion is output from the MSR circuitry 27 while another portion is blended between outputs of the neural network(s) 26 and the MSR circuitry 27.

The MSR circuitry 27 may include a high-performance tile-based memory-to-memory scaler and rotator that may be used to perform color management and/or tone mapping for at least some image types (e.g., high-dynamic range (HDR) images). As illustrated, the MSR circuitry 27 includes a read direct memory access and rotation interface (RDMA) 28, one or more scalers 29, and/or blend circuitry 30. The RDMA 28 receives data into the MSR circuitry 27 from an interface, such as an Advanced eXtensible Interface (AXI), an Advanced High-performance Bus (AHB), an Advanced System Bus (ASB), and/or Advanced Trace Bus (ATB). Whatever the interface type, the interface may provide an interface to memory. For instance, the interface may provide a direct memory access (DMA) connection to memory for processing image data.

The scaler(s) 29 may be used to upscale (or downscale) the image data in one or more dimensions. For example, the scaler(s) 29 may scale the image data in a vertical or horizontal direction by some degree (e.g., 2x) of upscaling/downscaling. As discussed below, the scaler(s) 29 may also perform various enhancements of the image processing, such as addressing artifacts created during image processing by the neural network(s) 26. The blend circuitry 30 may be used to blend an output from the neural network(s) 26 and the scaler(s) 29 that may be used to ameliorate at least some artifacts generated by the neural network-based image processing.

Figure 2:
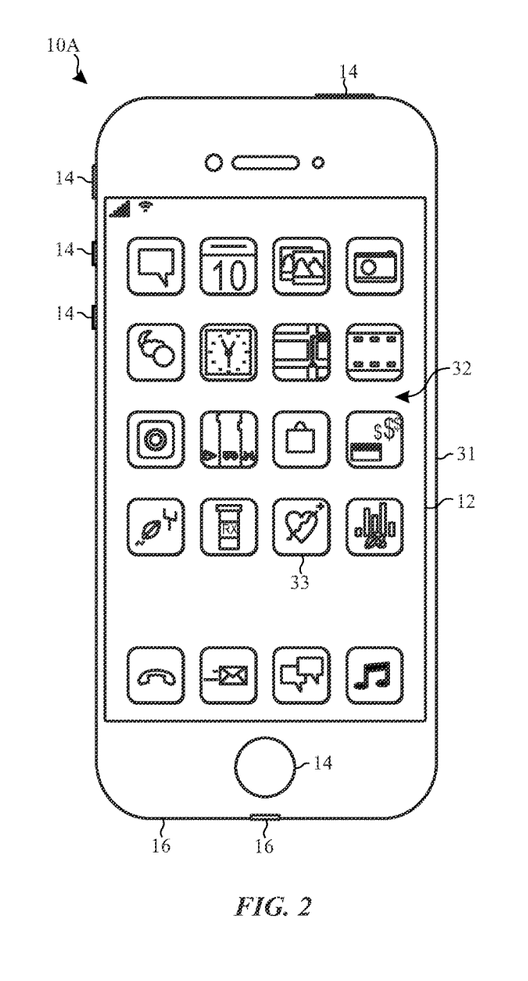
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

The handheld device 10A includes an enclosure 31 (e.g., housing). The enclosure 31 may protect interior components from physical damage and/or shield them from electromagnetic interference. In the depicted embodiment, the electronic display 12 is displaying a graphical user interface (GUI) 32 having an array of icons 33. By way of example, when an icon 33 is selected either by an input device 14 or a touch-sensing component of the electronic display 12, a corresponding application may launch.

Input devices 14 may extend through the enclosure 31. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. The I/O ports 16 may also extend through the enclosure 31. In some embodiments, the I/O ports 16 may include an audio jack to connect to external devices. As previously noted, the I/O ports 16 may include one or more speakers that output sounds from the handheld device 10A.

Figure 3:
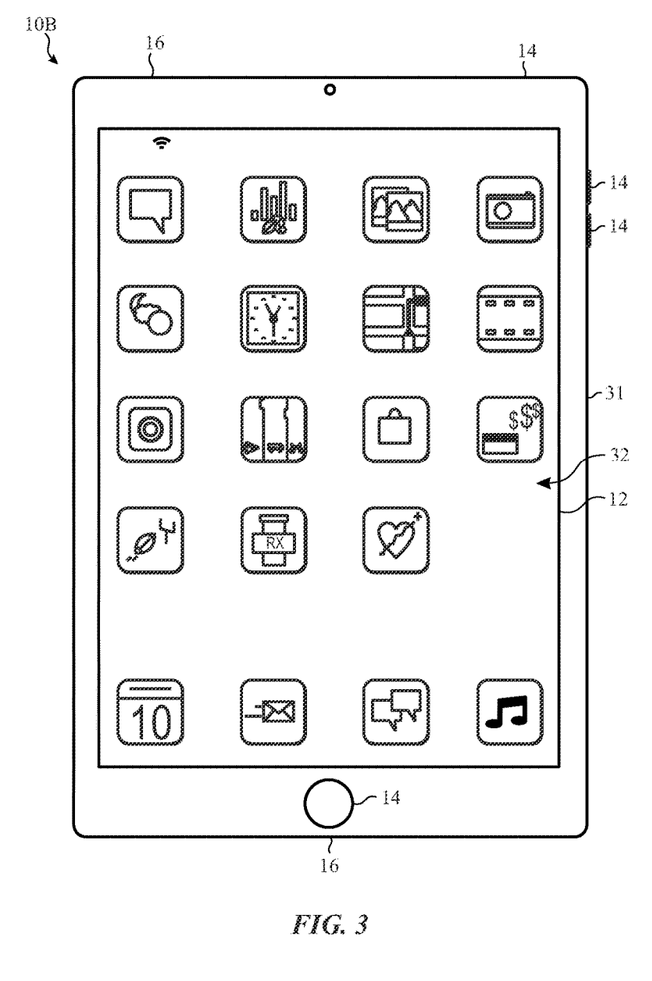
FIG. 3 is another example of the electronic device of FIG. 1, in accordance with an embodiment of the present disclosure.
Figure 4:
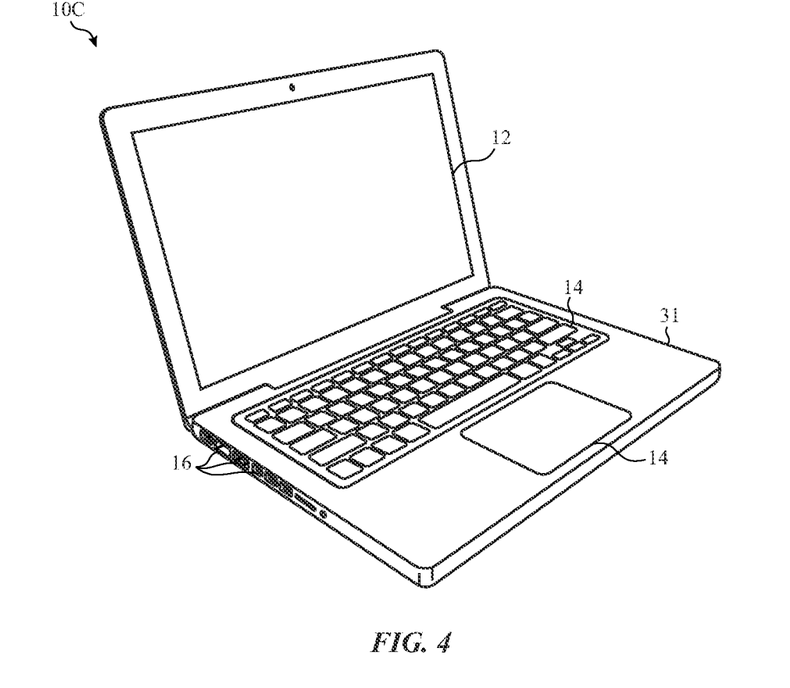
FIG. 4 is another example of the electronic device of FIG. 1, in accordance with an embodiment of the present disclosure.
Figure 5:
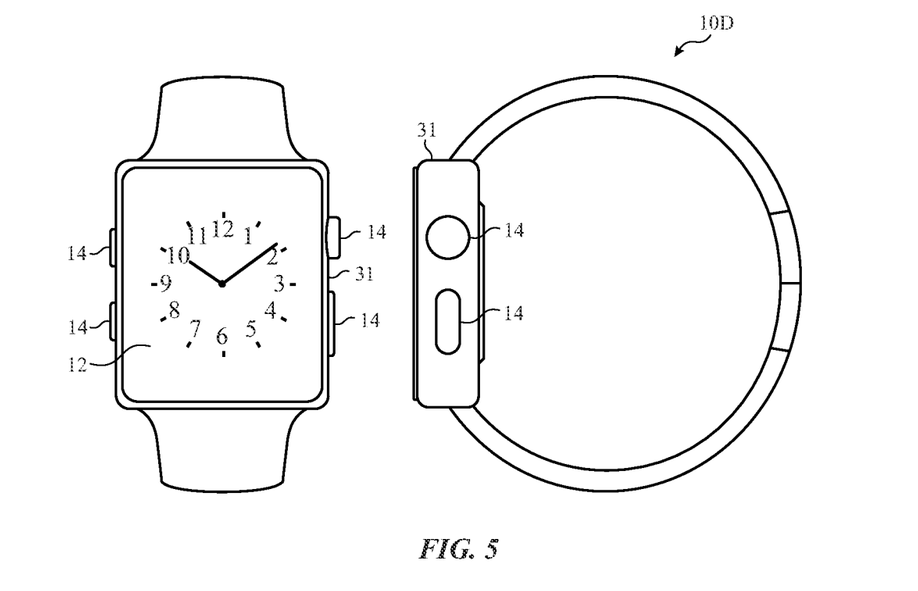
FIG. 5 is another example of the electronic device of FIG. 1, in accordance with an embodiment of the present disclosure.

Another example of a suitable electronic device 10 is a tablet device 10B shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 31.

Figure 6:
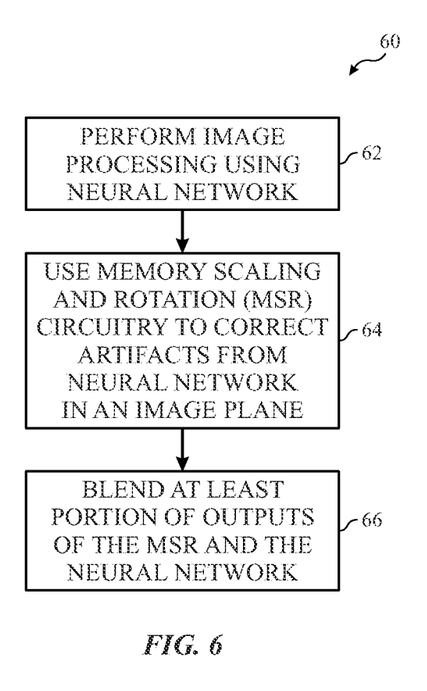
FIG. 6 is a block diagram for a process that may be used by the electronic device of FIG. 1 to perform neural network-based image processing with artifact compensation in the MSR, in accordance with an embodiment of the present disclosure.

FIG. 6 is a flow diagram of a process 60 that may be utilized by the electronic device 10. As illustrated, the neural network(s) 26 perform image processing on image content (block 62). Since the neural network(s) 26 may introduce artifacts, the MSR circuitry 27 may correct from artifacts in an image plane of the image data (block 64). Specifically, the image plane may include a plane of color content. For instance, the plane of color content may include two components of a multi-component format. For example, two planes of the YCbCr format may include the CbCr color plane with a constant luma Y.

Additionally or alternatively to the image plane, the MSR circuitry 27 may be used to correct artifacts in an independent alpha plane. For instance, the MSR circuitry 27 may be applied to an alpha channel (A channel) in image data in an AYCbCr format.

The blend circuitry 30 then blends the corrected data from the MSR circuitry 27 with the processed image data from the neural network(s) 26 (block 66). As discussed below, the blending and correction may correct for artifacts occurring at an edge of the image, super-resolution-related issues, and/or other neural network-created artifacts during image processing.

Figure 7:
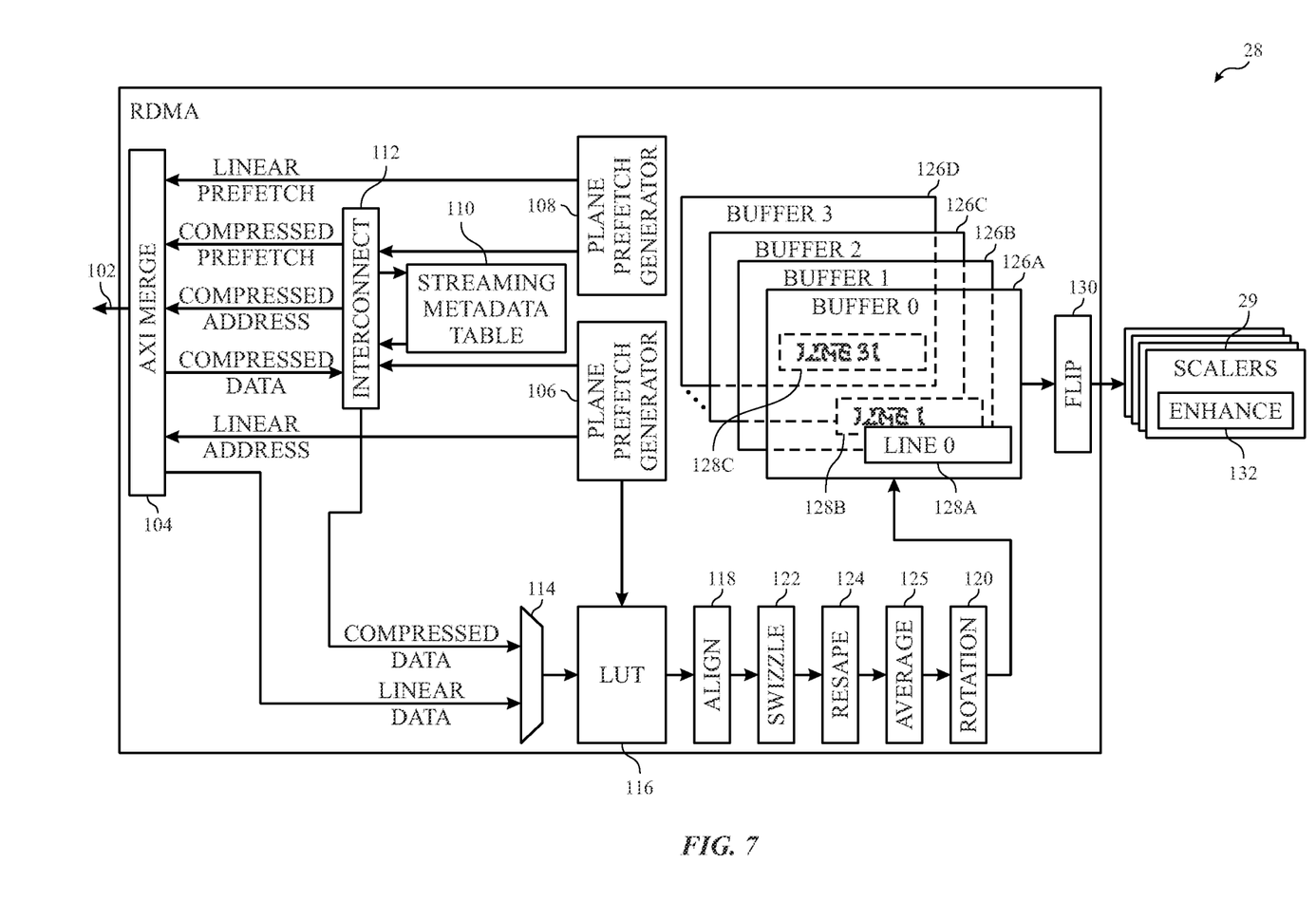
FIG. 7 is a block diagram of the MSR of FIG. 1 including a swizzle register and enhance circuitry, in accordance with an embodiment of the present disclosure.

FIG. 7 is a block diagram of an embodiment of the RDMA 28 of the MSR circuitry 27. As illustrated, the RDMA 28 may access memory via an interface 102, such as an AXI interface. The interface 102 may be used to receive image data using DMA or using other techniques. The image data may be received in a suitable image format. For instance, the RDMA 28 may receive data in YCbCr, AYCbCr, Y-only formats of various bit lengths (e.g., 8, 10, 12, or 16 bits), Alpha-only formats of various lengths (e.g., 8 or 16 bits). In some embodiments, the interface 102 may be used to saturate a bandwidth of the neural network(s) 26, the MSR circuitry 27, a display pipeline of the electronic device, and/or other bandwidth-limiting portion of the electronic device 10. For example, the interface 102 may be configured to provide a number (e.g., 16, 32, 64) of requests that may be handled by the MSR circuitry 27. The data over the interface 102 may be merged and/or separated using an interface merge 104. For instance, the interface merge may include one or more multiplexers and/or other routing circuitry. The interface merge 104 may also be used to compress/decompress data.

Regardless of format type, the RDMA 28 may receive an image plane of the image data from the neural network(s) 26. The image plane may be enhanced, and the MSR circuitry 27 (or other portion of the electronic device 10) may blend the image plane with an output of the enhanced data. The image plane surface may be read in progressive scans (e.g., vertical or horizontal strips) from the neural network(s) 26 output. In some embodiments, the MSR circuitry 27 may receive image data from other sources with 1, 2, 3, or more planes.

A plane request generator 106 may provide addresses for plane requests to the interface merge 104, and a plane prefetch generator 108 may provide a prefetch to the interface merge 104. Fetching may be performed using linear address-based fetches and/or tile fetching for tiled addressing. Compressed surfaces may use more than one (e.g., two) dependent fetches. The metadata may be fetched first, and compressed data may be fetched second fetch. Due to this bifurcated fetch, a miss in the metadata cache can stall a large number compressed data requests. To reduce the impact of such a scenario, the RDMA 28 contains a streaming metadata table 110 that can hold the metadata of multiple blocks (e.g., 256 or 1024 depending on size of macroblocks). The streaming metadata table 110 enables metadata fetching far ahead of a fetch of the actual compressed data fetch to avoid the large number of delays of compressed data requests due to a metadata fetch miss. The streaming metadata table 110 may communicate with the interface merge 104, the plane request generator 106, and/or the plane prefetch generator 108 via interconnection circuitry 112. The interconnection circuitry 112 may include timing circuitry (e.g., phase lock loops), registers, routing circuitry, and/or other circuitry to enable the interconnection of the streaming metadata table 110, the interface merge 104, the plane request generator 106, and/or the plane prefetch generator 108. Additionally or alternatively, the interconnection circuitry may combine compressed data from the interface merge 104 with metadata from the streaming metadata table 110.

Compressed data from the interconnection circuitry 112 and/or linear data from the interface merge 104 may be received at a multiplexer 114. The multiplexer 114 selectively routes the compressed data or the linear data to a lookup table (LUT) 116. The LUT 116 has a number of entries (e.g., 64) that correspond to requests with pixel destination coordinates. In some embodiments, the LUT 116 may be indexed using unique transaction identifiers for the requests. Since the data may arrive in different sizes (e.g., 8-bit, 16-bit, etc.), alignment circuitry 118 may align the incoming data to a specific size (e.g., 16-bit).

Furthermore, since the read data through the LUT 116 may be read out of order, rotation LUTs 120 may enable rotation of the data. The RDMA 28 may also include a swizzle register 122 that may be used to map any incoming component to another component's position for one or more planes received by the MSR circuitry 27. However, in some embodiments, components of some planes received from the neural network(s) 26 may not be rearranged by the swizzle register 122 while other planes may be rearranged using the swizzle register 122.

Figure 8:
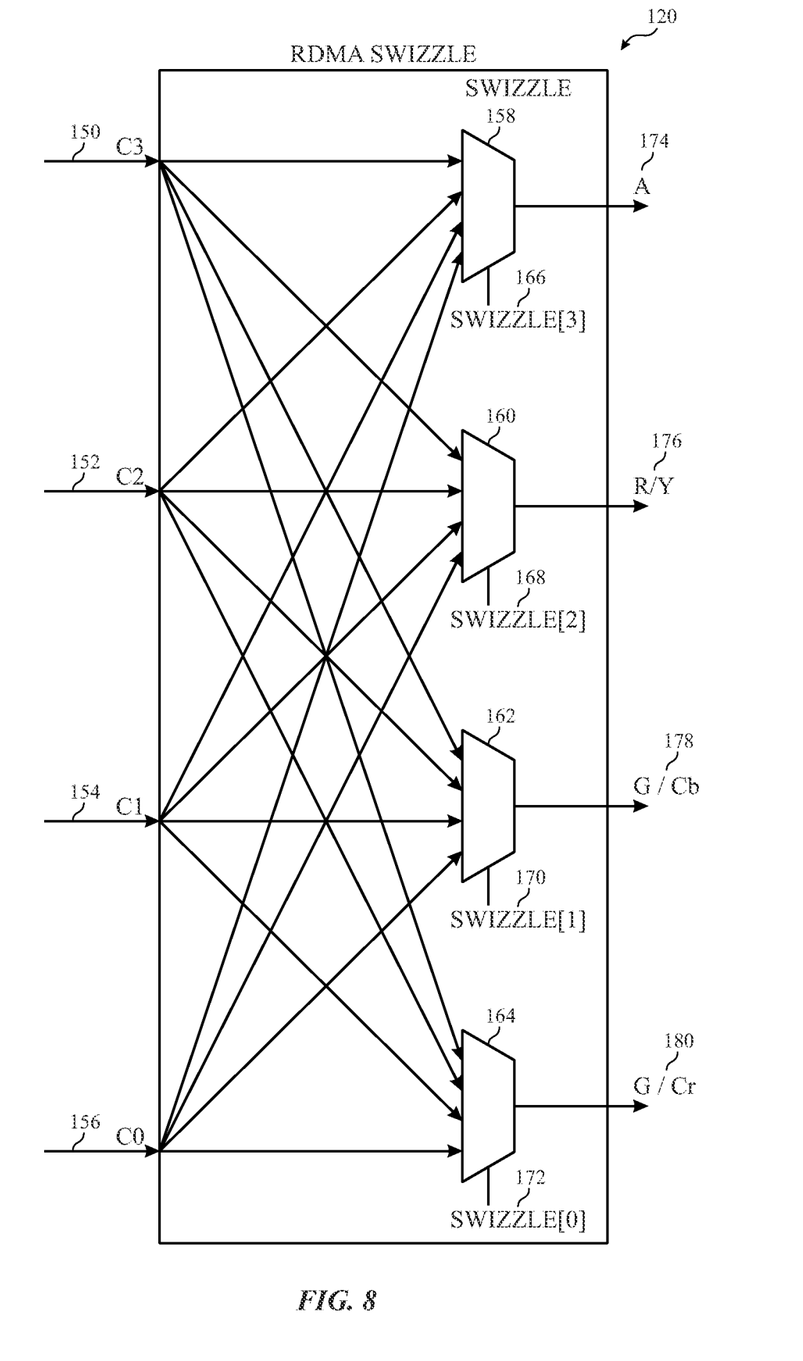
FIG. 8 is a schematic diagram of the swizzle register of FIG. 7, in accordance with an embodiment of the present disclosure.

FIG. 8 illustrates an example embodiment of the swizzle register 122. As illustrated, the swizzle register 122 receives components 150, 152, 154, and 156 at multiplexers 158, 160, 162, and 164. Multiplexing in the multiplexers 158, 160, 162, and 164 is controlled by respective control signals Swizzle[3] 166, Swizzle[2] 168, Swizzle[1] 170, and Swizzle[0] 172. The multiplexer 158 outputs an Alpha component 174 based on the Swizzle[3] 166. The multiplexer 160 outputs a Red or Luma (Y) component 176 based on the Swizzle[2] 168 and the image format used. The multiplexer 162 outputs Green or a Cb component 178 based on the Swizzle[1] 170. The multiplexer 164 outputs a Blue or Cr component 180 based on the Swizzle[0] 172.

In some embodiments, a first value (e.g., 0) for each component causes the respective multiplexer to pick a component closest to a least-significant bit (LSB), a second value (e.g., 1) causes the respective multiplexer to pick a component next-closest to the LSB, a third value (e.g., 2) causes the multiplexer to pick the component next-closest to a most-significant bit (MSB), and a fourth value (e.g., 3) causes the multiplexer to select the component closest to the MSB.

When using a two or three plane format some number of components will come from a first plane, some components will come from a second plane, and the rest, if a third plane is used, will come from a third plane. The first plane components may be given lowest indexes (e.g., C0, C1, . . . Cn−1), the second plane components may follow using the next lowest available indexes (e.g., Cn, Cn+1, Cn+m−1) and the third plane components may follow using the next lowest available indexes (e.g., Cn+m, Cn+m+1, Cn+m+k−1). In some embodiments, the components chosen by Swizzle[0] 172 and Swizzle[1] 170 originate from the same plane, since the "G/Cb" and "B/Cr" pipelines may share DMA resources. As previously noted single component formats may be used. In a Luma-only format, Swizzle[2] 168 may be set to the first value. In an Alpha-only format, Swizzle[3] 174 to the first value. Setting the signals as such enables the electronic device 10 to clock or power gate the Green or a Cb component 178 and/or the Blue or Cr component 180. YCbCr 4:2:2 1-plane formats are a special case using 2 Luma components in each pixel. In such situations, the MSB of Swizzle[2] 176 and the LSB of Swizzle[0] 172 determines the component order, and all other bits of the Swizzle register 122 are ignored. Thus, the YCbCr plane is handled first, and if any other plane is enabled, the other plane is used to provide the Alpha component.

Returning to FIG. 7, the MSR circuitry 27 includes reshaping LUTs 124 that may be used as general remapping LUTs for any fixed-point input formats. The reshaping LUTs 124 may be bypassed for some input formats (e.g., floating point 16 bit). The reshaping LUTs 124 may include more than one LUT. For example, the reshaping LUTs 124 may include a LUT per color component with each output computed independently from its corresponding input component. Component(s) from the neural network(s) 26 may optionally use the reshaping LUTs 124 for the Luma component if a separate reshaping enable bit is set and a reshaping bit for the other components is also set. The component from the neural network(s) 26 may forego reshaping if a signed bit is set specifying that the plane is signed. In some embodiments, some plane types (e.g., Alpha) may always bypass reshaping. The LUT values in the reshaping LUTs 124 may be distributed equally or unequally in a manner that enables interpolation of values.

The MSR circuitry 27 may also include averaging circuitry 125 that may be used to average a certain number (e.g., 2 or 4) pixels in a dimension (e.g., horizontal or vertical dimension) before the values are written to buffers 126. Pixel averaging may be applicable to any of the input planes input into the MSR circuitry 27. A number of samples of the components for each support size may be a multiple of a number (e.g., 4) to avoid averaging crossing a fetch boundary. If a source width is not a multiple of the certain number, edge replication may be used to pad out the pixel averaging operation for the source lines. The averaging circuitry 125 may perform sign-aware averaging that is cognizant of whether the plane is signed or unsigned using one or more set parameters. Signed averaging may be implemented such that averaging a negative value (−x) equals a negative of the positive value (x).

The values from the rotation LUTs 120 are then delivered to a corresponding buffer 126 (individually referred to as buffers 126A, 126B, 126C, and 126D). Each buffer 126 includes one or more corresponding line buffers 128 (individually referred to as line buffers 128A, 128B, 128C, and 128D). The data from the line buffers 128 may be flipped from one orientation to another using flip circuitry 130. The flip circuitry 130 may be used to flip the data order from horizontal to vertical, flip the data order from vertical to horizontal, reverse a vertical direction of the data, reverse a horizontal direction of the data, and the like. The data from the flip circuitry 130 is passed to the scaler(s) 29 that include enhance circuitry 132 configured to perform image enhancements and/or artifact remediation for artifacts introduced by the neural network(s) 26.

Figure 9:
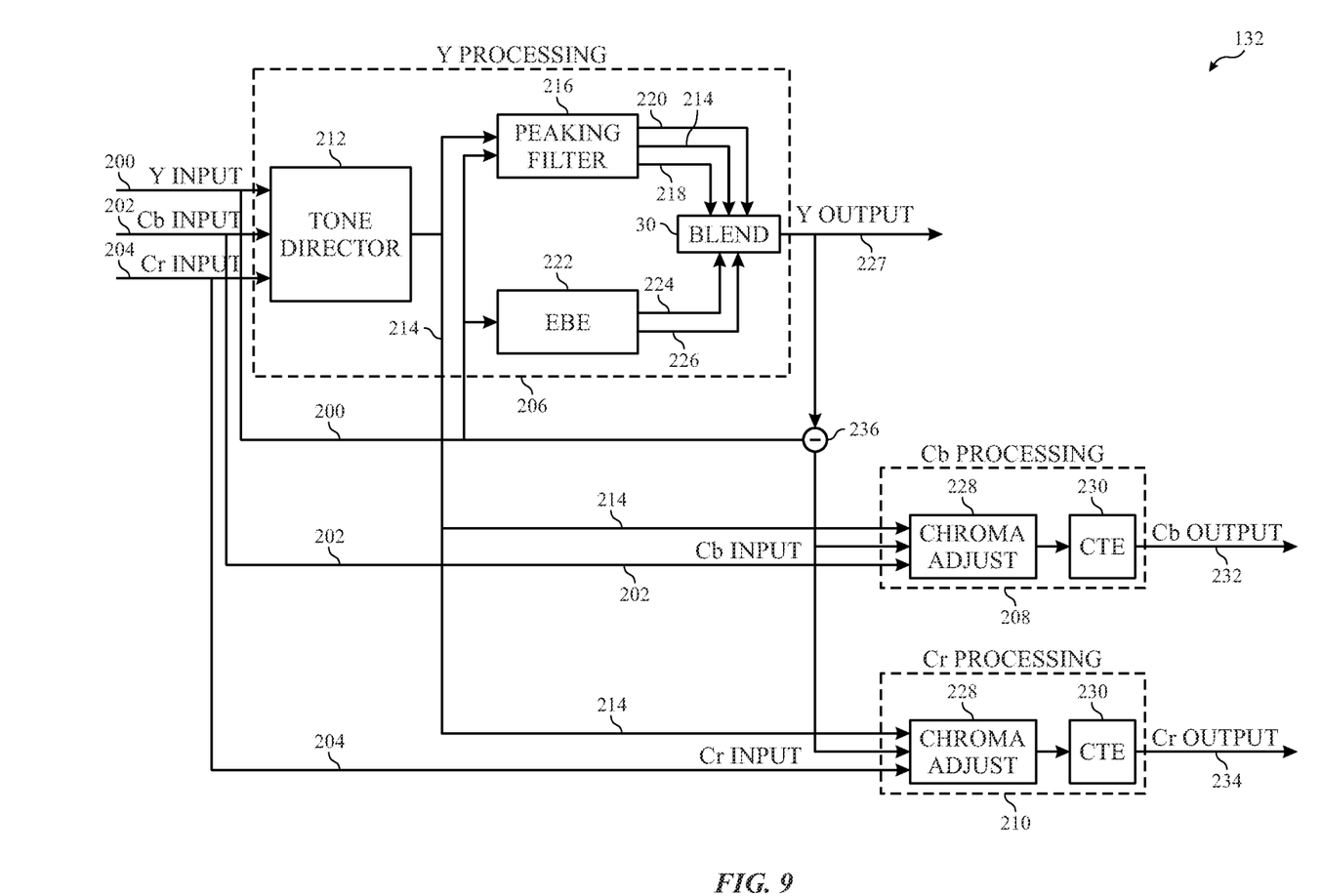
FIG. 9 is a schematic diagram of the enhance circuitry of FIG. 7 including blend circuitry, in accordance with an embodiment of the present disclosure.

FIG. 9 is a block diagram of an embodiment of the enhance circuitry 132. As illustrated, the enhance circuitry 132 may include several sub-modules. In some embodiments, the enhance circuitry 132 may be configured to perform enhancements on a particular image format (e.g., YCbCr). Additionally or alternatively, the enhance circuitry 132 may be used to enhance image data in other formats (e.g., RGB). If received image data is received in a format that the enhance circuitry 132 is not configured to process, the scaler(s) 29 may bypass the enhance circuitry 132. In the illustrated embodiment, the enhance circuitry 132 receives data in the YCbCr format, but, in some embodiments, the enhance circuitry 132 may be configured to receive data in the other formats.

Furthermore, the enhance circuitry 132 may process high-dynamic range (HDR) content. In some embodiments, the HDR content may only be processed when the image data is in a particular format. For instance, the enhance circuitry 132 may process HDR content in a first format (e.g., perceptual quantizer (PQ) HDR format) while it bypasses HDR content in a second format (e.g., linear RGB format). A programmable parameter may be used to set whether the enhance circuitry 132 is to perform processing on the image data. In some embodiments, the enhance circuitry 132 may convert incoming input data into a first format (e.g., 12-bit format) while output data may be output in a second format (e.g., 24-bit format).

As previously noted, the enhance circuitry 132 receives data in the YCbCr format. Accordingly, the enhance circuitry 132 receives a Y input 200, a Cb input 202, and a Cr input 204 (collectively referred to as "the inputs"). However, in embodiments where the data is received in other formats (e.g., RGB), the inputs may reflect the components of the corresponding format. The enhance circuitry 132 includes Y processing 206 to process the Y input 200, Cb processing 208 to process the Cb input 202, and Cr processing 210 to process the Cr input 204.

In the Y processing 206, a tone detector 212 detects a tone 214 by converting the YCbCr data to another format (e.g., RGB). The tone detector 212 then detects the tone 214 in a suitable color space, such as hue, saturation, value (HSV) color space. For instance, the tone 214 may indicate that the image data was determined to be closest to a particular defined tone level of a number (e.g., 8, 16, 32) of defined tone levels.

A peaking filter 216 may include one or more filters (e.g., high-pass filters) applied to the luminance channel (e.g., the Y input 200) to determine maximum horizontal and/or vertical values for one or more positions in the image data and provides the maximum horizontal and/or vertical values as edge information 218. The peaking filter 216 may also determine a peak output 220 that is an indication of a maximum input value plus some overshoot value to be used to perform a luminance transition. In some embodiments, the peaking filter 216 may be enabled by a programmable bit. When the peaking is disabled, the output of the peaking filter 216 may be the same as its input without calculating at least some values (e.g., the peak output 220) either repeated as input values and/or may not be transmitted from the peaking filter 216. However, some signals (e.g., the edge information 218) may be calculated and/or transmitted independently of the programmable bit used to enable/disable the peaking filter 216 since such signals may be used by the blend circuitry 30 whether or not the peaking filter 216 is enabled.

The enhance circuitry 132 may also include an example-based enhancement (EBE) circuitry 222 that may be selectively used to compare blocks of pixels (e.g., 5 pixel-block around a pixel being analyzed) from a low-resolution original input image and a high-resolution scaled image (e.g., Y input 200). The EBE circuitry 222 uses the comparison to generate a delta signal 224 indicating a difference between the blocks and an upscaled Y input 226.

As previously discussed, the blend circuitry 30 may be used to blend corrections to artifacts due to neural-network-based image processing. As discussed below, this blending may use the outputs of the peaking filter 216 and/or the EBE circuitry 222 to perform such blending. Using the outputs of the peaking filter 216 and/or the EBE circuitry 222, the blending circuitry 30 generates a Y output 227.

Both the Cb processing 208 and the Cr processing 210 may include a chroma adjust 228 and a chroma transition enhance (CTE) 230 to generate respective outputs, Cb output 232 and Cr output 234. The CTEs 230 calculate respective filter values in one or more directions with overshoot and undershoot control to apply to the Cb input 202 and the Cr input 204 to sharpen the Cb and Cr channels, respectively.

When luminance is increased above some threshold, the enhancement of the luminance may lead to a visible change in saturation. To compensate for such changes, chroma values may be adjusted based on the luminance variations. To determine the amount of adjustment applied, the Y input 200 may be subtracted from the Y output 227 via a subtractor 236. The difference in the Y input 200 and the Y output 227 are transmitted to the chroma adjusts 228. For example, the chroma adjusts 228 may utilize a LUT based at least in part on the difference and/or may use a transfer function to calculate an amount of the adjustment of the Cb output 232 and/or the Cr output 234 based at least in part on the difference.

Figure 10A:
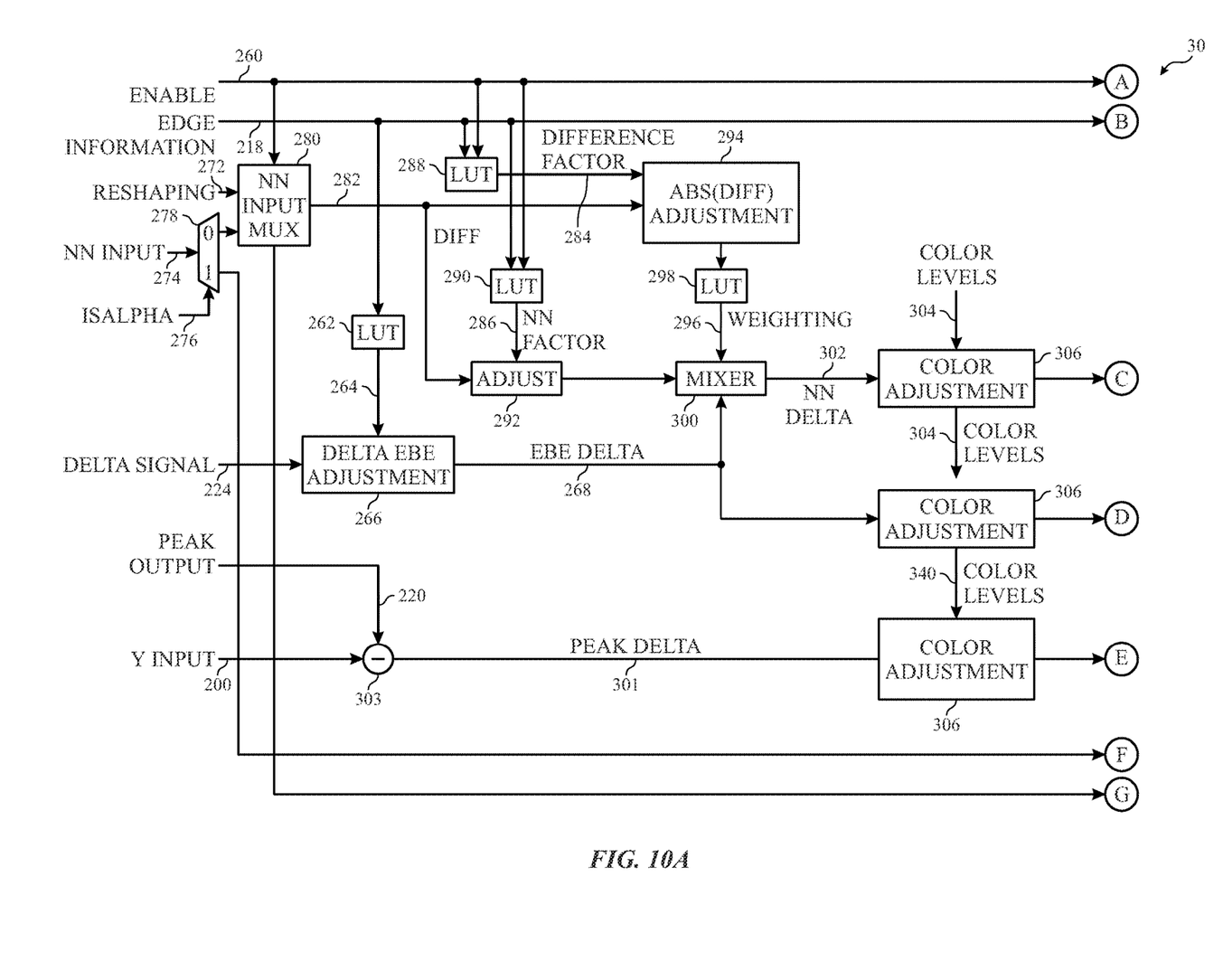
FIG. 10A is a schematic diagram of a first portion of the blend circuitry of FIG. 8, in accordance with an embodiment of the present disclosure.
Figure 10B:
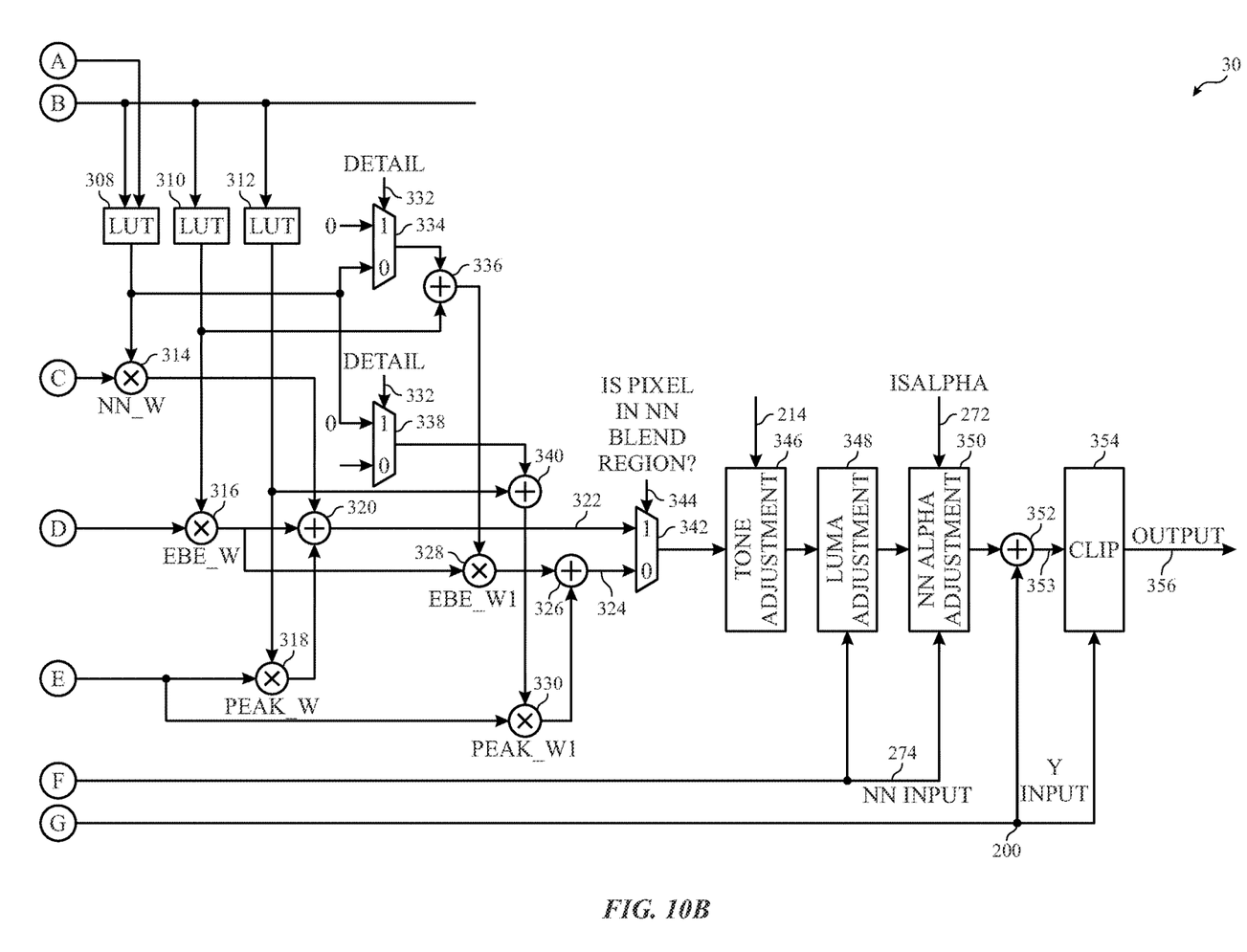
FIG. 10B is a schematic diagram of a second portion of the blend circuitry of FIG. 8, in accordance with an embodiment of the present disclosure.

FIGS. 10A and 10B is a schematic diagram of an embodiment of the blend circuitry 30. As illustrated, the blend circuitry 30 receives the edge information 218, the Y input 200, the delta signal 224, the peak output 220, and the tone 214. The tone 214 may include levels and/or thresholds of one or more colors (e.g., green, red, and/or blue). The blend circuitry 30 may also receive an enable signal 260. The enable signal 260 may indicate whether an image plane is to be received from the neural network(s) 26. The enable signal 260 may also indicate whether the receive image plane is to be interpreted as alpha for the lending.

The blend circuitry 30 uses the edge information 218 in a lookup table (LUT) 262 to determine an EBE factor 264 based on the edge information 218. In some embodiments, the EBE factor 264 may be clipped and/or scaled to a corresponding range (e.g., 0-255) able to be represented by a corresponding number of bits (e.g., 8). The LUT 262 may include multiple thresholds for determining the EBE factor 264 based on a comparison of the edge information 218 to the thresholds. The EBE factor 264 is applied to the delta signal 224 in delta EBE adjustment circuitry 266 to generate the EBE delta 268 controlling how much adjustment is made based on calculations in the EBE circuitry 222. The EBE factor 264 and the resulting EBE delta 268 are adjusted to insure that too much enhancement is avoided in large edge areas where such enhancement may lead to artifacts from the neural network-based image processing.

The blend circuitry 30 may also receive a reshaping signal 272 that indicates whether a neural network (NN) input 274 has been reshaped in the MSR circuitry 27 or is a residual image. When the NN input 274 is related to alpha, an isalpha 276 is used to control routing of the NN input 274 via a demux 278. When the NN input 274 is not an alpha image plane, the demux 278 routes the NN input signal to an NN input mux 280. Blending of the NN input 274 may be enabled or disabled using the enable signal 260. When the enable signal 260 disables blending of the NN input 274, the NN input 274 may be set to a disabled value (e.g., 0). Similarly, a differential 282, a difference factor 284, and an NN factor 286 may all be set to corresponding disabled values (e.g., 0) using the NN input mux 280, the LUT 288, and LUT 290, respectively.

When the enable signal 260 enables blending, the reshaping signal 272 may indicate to the NN input mux 280 whether the NN input 274 is a residual image or a newly reshaped image. When isalpha 276 is set to an enabled value (e.g., 1), the NN input 274 is an alpha map to control scan enhancement. In some embodiments, when isalpha 276 is enabled, the reshaping signal 272 may indicate that the NN input 274 is not a residual image.

When isalpha 276 indicates that the NN input 274 is not alpha while the reshaping signal 272 indicates that the NN input 274 is not a residual image, the NN input 274 represents an image output from the neural network(s) 26. In such situations, the NN input mux 280 causes the differential 282 to be equal to the NN input 274 when the shaping signal 272 indicates that the NN input 274 is a residual image or equal to a difference between the NN input 274 and the Y input 200. Also, in such situations, the difference factor 284 may be set by the LUT 288 to a value to how heavily to weight the difference based on the edge information 218. Similarly, the NN factor 286 may be set by the LUT 290 to a value based on the edge information 218. An adjust circuitry 292 uses the NN factor 286 to adjust the differential 282.

When blending, an absolute value calculator 294 may determine an absolute value of the differential 282. As the absolute value of the difference increases, a likelihood of an artifact in the NN input 274 may increase. Accordingly, a weighting 296 is determined by a LUT 298 based on the absolute value of the differential 282. Accordingly, a mixer 300 mixes the EBE delta 268 and an NN delta 302 based on the absolute value of the difference. As such, the mixer 300 may include one or more LUTs for determining the weighting 296 for the EBE delta 268 and the NN delta 302 with one or more thresholds. For instance, when a larger difference exists, a larger portion of the EBE delta 268 is used to compensate for and/or reduce artifacts in the NN input 274.

In some embodiments, the EBE delta 268 and the NN delta 302 may be supplementary where an increase to one includes a decrease of the other. Thus, a change in the weighting 296 may adjust both the EBE delta 268 and the NN delta 302.

The blending circuitry 30 may also determine a peak delta 301 that is an indication of a difference between a peak output 220 and the Y input 200. The peak delta 301 may be determined using a subtractor 303.

The blending circuitry 30 selectively blends the EBE delta 268, the peak delta 301, and the NN delta 302. In some embodiments, one or more colors may be adjusted using one or more color levels 304 from the tone detector 212. The color level(s) 304 may be used by color adjustors 306 to adjust the respective EBE delta 268, the peak delta 301, and the NN delta 302. The color level(s) 304 applied to adjust each channel for the respective EBE delta 268, the peak delta 301, and the NN delta 302 may be the same color(s) (e.g., red, green, or blue). Additionally or alternatively, the color level(s) 304 applied to adjust each channel may be for different colors or combinations of colors.

The blending of the EBE delta 268, the peak delta 301, and the NN delta 302 may be weighted. To apply weights, LUTs 308, 310, and 312 may be used to selectively apply an NN weight 314, an EBE weight 316, and a peak weight 318, respectively. The amounts of the respective weights may be based on the edge information 218. Furthermore, if the enable signal 260 disables blending of the NN input 274, the LUT 308 may drive the NN weight 314 to a disabled value (e.g., 0). The weighted versions of the EBE delta 268, the peak delta 301, and the NN delta 302 are summed in an adder 320 to generate a total enhancement 322.

The total enhancement 322 is to be applied to pixels inside a neural network blend region to be blended with the NN input 274. Outside of the region, a blend 324 is to be used. The blend 324 is based at least in part on the EBE delta 268 and the peak delta 301 added in an adder 326 without adding the NN delta 302 in the adder 326. Specifically, the EBE delta 268 and the peak delta 301 may be weighted using additional weights EBE_w1 328 and peak_w1 330. When the blend 324 is to be used, some details may have been blended in the neural network(s) 26. A detail signal 332 may indicate whether the details have been blended in the neural network(s) 26. When the detail signal 332 indicates that the details have been blended in the neural network(s) 26, the NN weight 314 may be added to the EBE delta 268 via a multiplexer 334 and an adder 336. Similarly, when the detail signal 332 indicates that the details have been blended in the neural network(s) 26, the NN weight 314 may be also added to the peak delta 301 via a multiplexer 338 and an adder 340. However, if the detail signal 332 indicates that the details have not been blended in, the EBE weight 316 is the same as the EBE_w1 328, and the peak weight 301 is the same as the peak_w1 330.

A multiplexer 342 may be used to select between the total enhancement 322 or the blend 324 based on a control signal 344 indicative of whether a pixel is in an NN blend region. In some embodiments, the output of the multiplexer 342 may be applied directly. Additionally or alternatively, additional processing may be performed on the output of the multiplexer 342. As illustrated, a tone adjustment 346 may be applied based on a tone 214 from the tone detector 212. Additionally or alternatively, a threshold for one or more colors (e.g., blue) may be applied to determine a degree and/or direction to adjust the colors in the output of the multiplexer 342.

In addition or alternatively to the adjustment of tone adjustment 346, the electronic device 10 may apply a luma adjustment 348. The luma adjustment may be based on the Y input 200, where the luma may be adjusted up or down based on a comparison of the Y input 200 to one or more thresholds. Additionally or alternatively, an NN alpha adjustment 350 may be applied if isalpha 276 indicates that the NN input 274 is to be interpreted as alpha values.

After all the adjustments and/or blending, the adjusted and blended output may be added to the Y input 200 via an adder 352 as an enhanced Y input 353. In some embodiments, the enhanced Y input 353 may utilize a clip 354 that clips the enhanced Y input 353 to an upper threshold as an output 356 when the enhanced Y input is above the upper threshold. Additionally or alternatively, the clip 354 may clip the enhanced Y input 353 to a lower threshold as the output 356 when the enhanced Y input is below the lower threshold. In some embodiments, when Y input 200 is above the upper threshold, the blending and enhancement in the blending circuitry 30 previously discussed may be bypassed with the clip 354 by setting the output 356 to the upper threshold.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
 a neural network configured to receive and process image data;
 enhancement circuitry configured to receive and enhance the image data; and
 blending circuitry that comprises a first multiplier and that is configured to:
  receive the processed image data;
  receive the enhanced image data;
  receive edge information related to the image data;
  receive an image plane of the image data;
  determine a first weight in a first lookup table based at least in part on the edge information and based at least in part on a neural network enable signal;
  scale the processed image data based on the first weight using the first multiplier to generate a processed component;
  determine a second weight in a second lookup table based at least in part on the edge information;
  scale the enhanced image data based on the second weight; and
  add the scaled processed image data and the scaled enhanced image data together.

2. The electronic device of claim 1, wherein the second lookup table is configured to output the second weight based at least in part on the edge information, wherein the blending circuitry comprises a second multiplier configured to scale the enhanced image data with the second weight to generate an enhanced component.

3. The electronic device of claim 2, wherein the blending circuitry comprises an adder configured to add the enhanced component and processed component together.

4. The electronic device of claim 3, wherein the blending circuitry comprises a subtractor configured to subtract the image plane from a peak output to determine a peak delta.

5. The electronic device of claim 4, wherein the blending circuitry comprises:
 a third lookup table configured to output a third weight based at least in part on the edge information; and
 a third multiplier configured to scale the peak delta with the third weight to generate a peak component.

6. The electronic device of claim 5, wherein the adder is configured to add the peak component with the processed component and the enhanced component.

7. The electronic device of claim 1, wherein receiving and processing the image data using the neural network comprises:
 generating a segmentation map during a first operation of the neural network; and
 processing image data with a portion of the image data more heavily processed than other portions of the image data based on the segmentation map.

8. The electronic device of claim 1, wherein the image plane comprises a luma channel of the image data, wherein the image data is formatted in YCbCr color space, and the image plane comprises the Y channel of the image data.

9. The electronic device of claim 1, comprising an adder configured to add the scaled processed image data and the scaled enhanced image data together.

10. The electronic device of claim 9, wherein the blending circuitry comprises a peak channel configured to:
 receive an image channel of the image data; and
 receive a peak output from the enhancement circuitry.

11. The electronic device of claim 10, wherein the peak channel is configured to:
 determine a peak change based at least in part on the image channel and the peak output; and
 scale the peak change based at least in part on the edge information, wherein the adder is configured to add the scaled peak change to the scaled processed image data and the scaled enhanced image data to blend the neural network, the enhancement circuitry, and the peak channel.

12. Blending circuitry, comprising:
 an input configured to receive edge information about image data, wherein the edge information comprises an indication of a boundary of one or more regions of the image data;
 a neural network channel configured to:
  receive processed image data that is processed from the image data in one or more neural networks, wherein the processed image data is received from the one or more neural networks; and
  scale the processed image data based at least in part on the edge information;
 an enhancement channel configured to:
  receive enhanced image data that is enhanced from the image data in enhance circuitry and received from the enhance circuitry; and scale the enhanced image data based at least in part on the edge information; and an adder configured to add the scaled processed image data and the scaled enhanced image data to blend the neural network channel and the enhancement channel; and a peak channel configured to:
receive an image channel of the image data;
receive a peak output from the enhance circuitry;
determine a peak change based at least in part on the image channel and the peak output; and
scale the peak change based at least in part on the edge information, wherein the adder is configured to add the scaled peak change to the scaled processed image data and the scaled enhanced data to blend the neural network channel, the enhancement channel, and the peak channel.

13. The blending circuitry of claim 12, wherein the image data is processed in an image plane that comprises a luma channel of the image data, wherein the image data is formatted in YCbCr color space, and the image plane comprises the Y channel of the image data.

14. The blending circuitry of claim 12, comprising an output adder configured to receive an output from the adder and to add the output to the image data to generate a blended output.

15. The blending circuitry of claim 12, wherein the neural network channel comprises a lookup table that is configured to output a weight used in scaling the processed image data based at least in part on the edge information.

16. The blending circuitry of claim 15, wherein the lookup table is configured to output the weight based at least in part on a neural network enable signal.

17. A method, comprising:
applying image processing to image data using one or more neural networks to generate processed image data;
enhancing the image data in a scaling circuitry to generate enhanced image data;
receiving an image plane of the processed image data at blending circuitry of the scaling circuitry;
determining edge information related to the image data; and
determining a first weight in a first lookup table based at least in part on the edge information;
scaling the processed image data based on the first weight;
determining a second weight in a second lookup table based at least in part on the edge information;
scaling the enhanced image data based on the second weight; and
adding the scaled processed image data and the scaled enhanced image data together wherein adding the scaled processed image data and the scaled enhanced image data together comprises:
determining a peak delta by subtracting the image plane from a peak output;
determining a third weight in a third lookup table based at least in part on the edge information; and
scaling the peak delta based at least in part on the edge information and adding the scaled peak data to the scaled processed image data and the scaled enhanced image data.

18. The method of claim 17, wherein the image plane comprises a luma channel of the image data, wherein the image data is formatted in YCbCr color space, and the image plane comprises the Y channel of the image data.

19. The method of claim 17, wherein determining the first weight in the first lookup table is based at least in part on a neural network enable signal.

* * * * *